May 19, 1970 W. H. VANDER HEYDEN 3,512,410
TRIGGERING CIRCUIT

Filed June 29, 1967 3 Sheets-Sheet 1

INVENTOR.
WILLIAM HAROLD VANDER HEYDEN
BY  PENDLETON, NEUMAN
SEIBOLD & WILLIAMS

ATTORNEYS

May 19, 1970 W. H. VANDER HEYDEN 3,512,410
TRIGGERING CIRCUIT
Filed June 29, 1967 3 Sheets-Sheet 2

INVENTOR.
WILLIAM HAROLD VANDER HEYDEN
BY PENDLETON, NEUMAN
SEIBOLD & WILLIAMS

ATTORNEYS

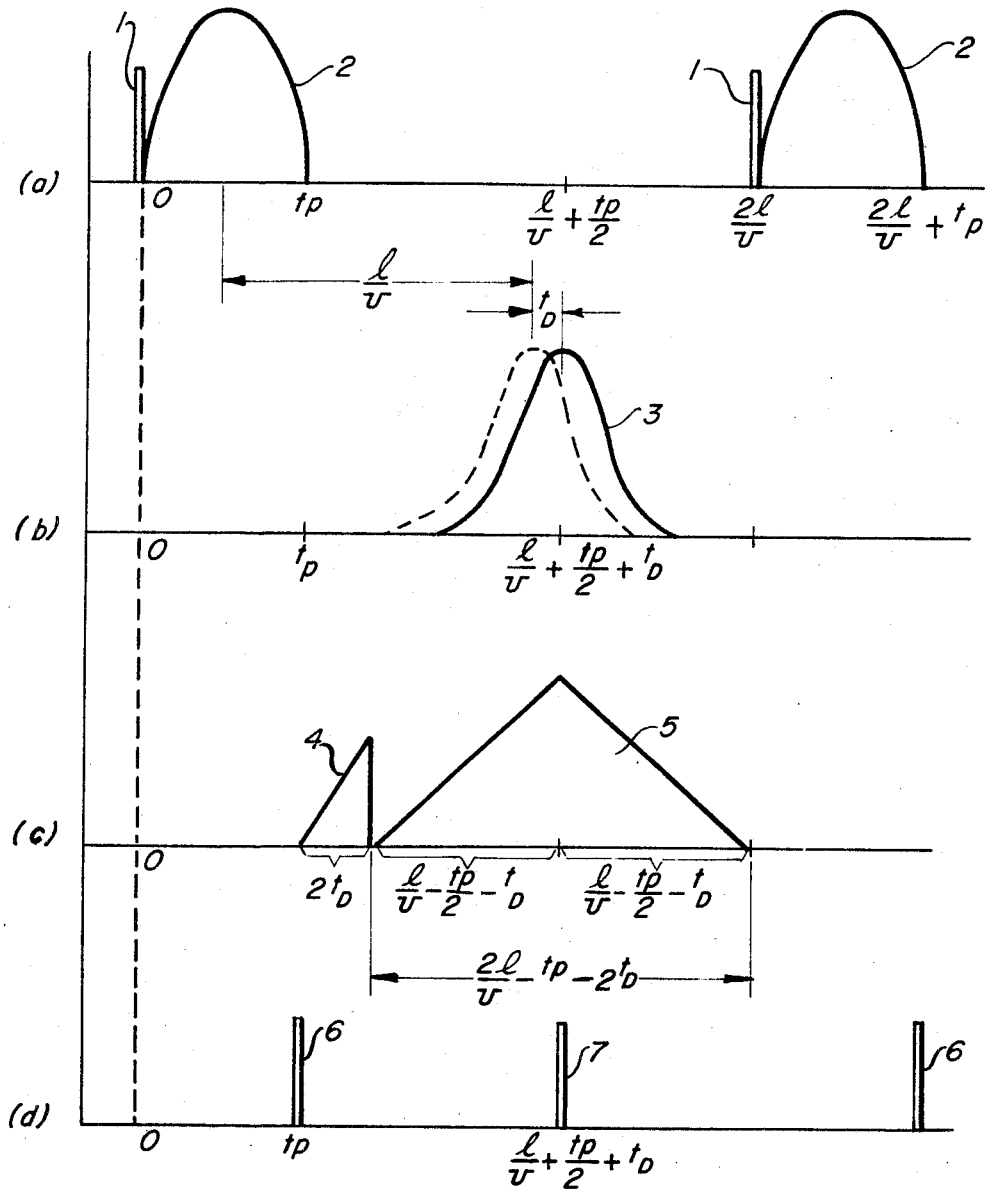

United States Patent Office 3,512,410
Patented May 19, 1970

---

3,512,410
TRIGGERING CIRCUIT
William Harold Vander Heyden, Menomonee Falls, Wis., assignor to Badger Meter Manufacturing Company, Milwaukee, Wis., a corporation of Wisconsin
Filed June 29, 1967, Ser. No. 649,919
Int. Cl. G01p 5/18
U.S. Cl. 73—194         10 Claims

ABSTRACT OF THE DISCLOSURE

A triggering circuit for use with a flow meter in which boluses of fluid are tagged in response to the detection of previously tagged boluses at a location downstream from the tagging location. The triggering circuit establishes the center of symmetry of the tagged boluses, and compensates for the length of the bolus and for delays inherent in the detecting system.

---

This invention relates to a triggering circuit, and more particularly to such a circuit for triggering repetitive tagging signals in connection with investigations of fluid flow.

Many attempts have been made in the flowmeter art to obtain an inference of the rate of flow of a fluid by tagging it in some way and detecting the tag at a remote, downstream location. As the time at which the fluid is tagged is known, and the time at which the tag passes a detection station can be determined, the rate of flow can be calculated directly, taking cognizance of the other known quantities for the cross-sectional area of the flow path and the distance between the tagging station and the detection station.

The mechanism for tagging the fluid may depend on raising the temperature of a bolus of fluid, or injecting a quantity of a tagging material to it, or varying the electrical or magnetic properties of a bolus of the fluid. No matter what tagging mechanism is used, however, it is desirable to make the tag as short and as crisp as possible in order clearly to define the bolus which is tagged, and to create, as far as possible, a sharp pulse at the detecting station. However, the shorter the tagging pulse, the weaker will be the detected signal, so that, depending on the noise inherent in the combination of the fluid system and the detecting system, there is a minimum length of a tagging pulse which can be detected within any required degree of certainty. The finite length of any practical tagging pulse causes an apparent shortening of the distance between the tagging station and the detection station.

In addition, the action of the fluid itself elongates and degrades the tagged bolus as is passes downstream. If the flow is laminar, the central part of the flowing stream travels at a faster rate than the part adjacent the walls of the conduit, and if the flow is turbulent, there is some natural spreading of the tagged fluid, because of the fluid agitation. When the fluid's paramagnetic properties are modified in accomplishing the tagging, there is also some loss of resolution of the tagged bolus with time. This is of course true when the tagging is accomplished by heating means or the like.

One possible solution to the problem of detecting a degraded pulse, is to seek the leading edge of the pulse at the detecting station. For low flow rates, however, the tag is degraded proportionately more than for high flow rates, so that the leading edge is not as steep as it is for high flow rates, and a threshold detector would be activated by a slow moving bolus longer after the leading edge than by a fast moving bolus. In addition, no compensation is provided for the length of the bolus. Accordingly, this kind of a system produces an error inherently in its operation.

It is therefore an object of the present invention to provide a means for minimizing the error in detecting the time of passage of a tagged bolus of fluid.

Another object of the present invention is to provide a triggering circuit for compensating for length of the tagged bolus.

These and other objects of the present invention will become manifest upon an examination of the following description and the accompanying drawings, in which:

FIG. 4 is a flow chart indicating certain sequences of operations of the apparatus illustrated in FIGS. 1–3.

Figure 1:
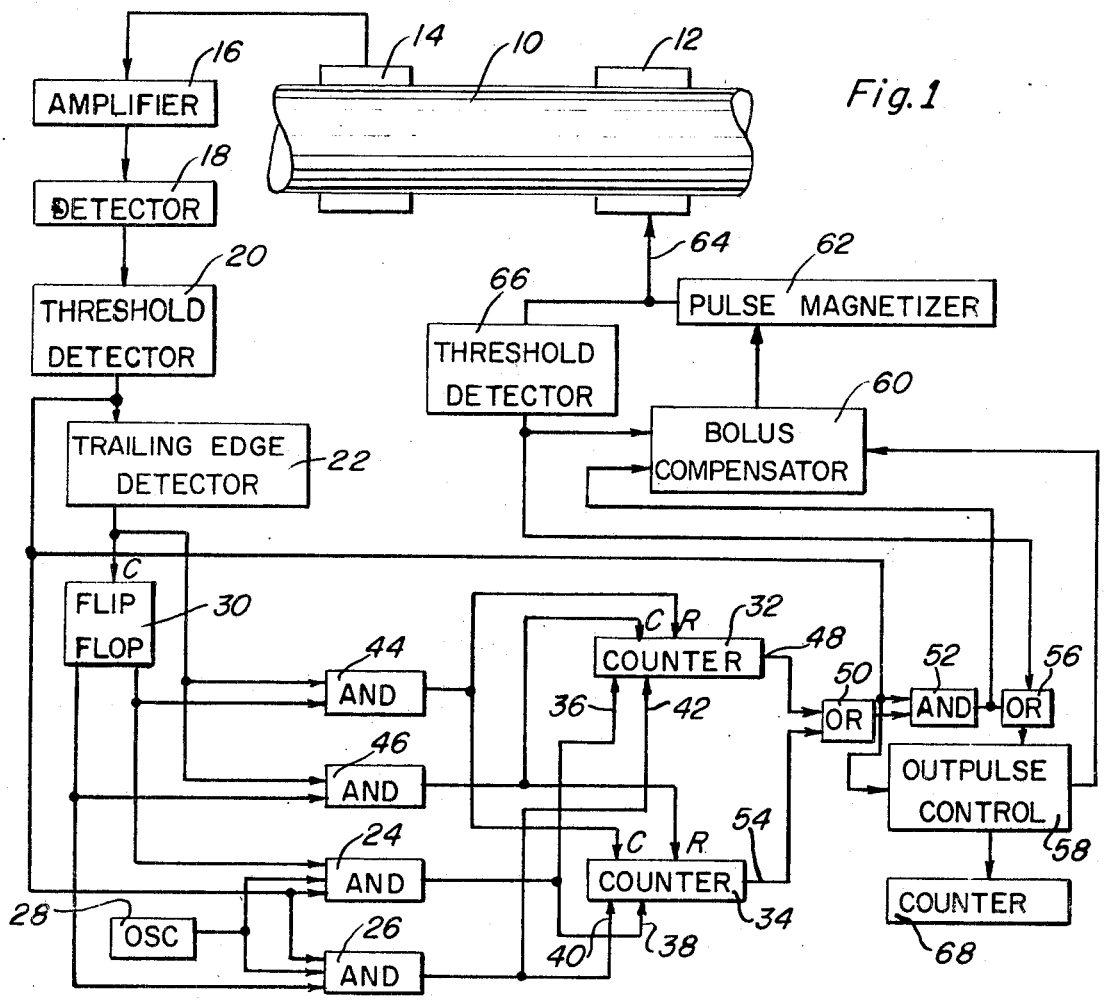
FIG. 1 is a functional block diagram of an illustrative embodiment of the present invention.

In one embodiment of the present invention, there is provided means for determining the center of symmetry of a tagged bolus as the same passes the detecting station, and means responsive to such detection for generating a first pulse beginning a fixed time following the arrival of the center of symmetry of said bolus at said detection station, for triggering a subsequent tagging of the fluid. There is also provided means responsive to said last named means for producing a second pulse following said first pulse by an amount dependent upon the length of the previous tagging pulse, and also dependent upon said fixed time, to compensate both for the length of the bolus, and for delays inherent in the system.

The present invention will be specifically described in connection with a flowmeter system in which tagging is accomplished by the resonant discharge of a capacitor into a solenoidal coil, wound on a nonconductive, non-magnetic pipe. Detection of the nuclear magnetic tag is accomplished by an NMR detector of any convenient design, and detection of a pulse initiates the next tagging pulse, so that total fluid flow is proportional to the total number of pulses, and the pulses may simply be counted to reveal total fluid flow. Flow velocities are variable, so that tagged bolus length varies between the length of the magnetizing solenoid at low velocities to about nine inches at high velocities. The time length of the detected bolus is long enough so that the envelope of the signal generated at the detecting station is symmetric for all but very low flow velocities.

In the flowmeter of the present invention, a digital counter seeks out the center of symmetry of the signal generated at the detecting station on the basis of the preceding bolus duration. This is accomplished by means of a threshold detector which triggers the first of two counters on when the bolus leading edge passes, and off when the trailing edge passes thereby storing the bolus duration. The second counter which has the previous bolus duration stored, is complemented at the end of the preceding bolus and the second flip-flop in this counter chain is triggered on when the bolus leading edge passes. This chain now counts twice as fast as the first counter and overflows when half the total count of the preceding bolus is reached. The overflow triggers a pulse which marks the center of symmetry of the bolus. For the next bolus, the functions of the two counters are interchanged. In this manner, the time center of each bolus is marked based upon the half duration of the preceding bolus. because two threshold measurements occur for each center detection, error due to random noise is reduced by $\sqrt{2}$. By virtue of the fact that the basic meter output is a quantity count, random error of the flow totalization is reduced by the square root of the number of flow increments totalized, and approaches zero for large totalized quantities.

The meter factor, that is, the number of output pulses per quantity of fluid passed, or the reciprocal of the apparent fluid volume in the pipe between the centers of the magnetizer and detector coils, is dependent upon magnetizing pulse duration and the time delay in the feedback path which retriggers the pulsed magnetizer.

The magnetization $M_Z(t)$ imparted to the fluid by a pulse of current 2 (FIG. 4a) in the magnetizer coil is approximately $$M_Z(t) = XoH_{oM}\left[1 - \exp\left(\frac{-t_p}{T_1}\right)\right]$$

if $t_p \ll d_1/v$ where:
$t_p$ = pulse duration
$d_1$ = coil length
$v$ = fluid velocity
$H_{oM}$ = magnetizing field strength
$Xo$ = magnetic susceptibility of the fluid and $$M_z(t) = XoH_{oM}\left[1 - \exp\left(\frac{-d_1}{vT_1}\right)\right]$$

if $t_p \geq d_1/v$

To achieve maximum magnetization in at least one increment of the bolus length, $t_p$ should be chosen according to $t_p \leq d_1/v_{mnx}$.

This means that fluid just entering the coil at the beginning of the current pulse is just leaving at the end of the pulse and thus achieves maximum magnetization. The true magnetization peak in the fluid is not created until the instant the current pulse disappears. For this case, as for the general case, the center of the magnetized bolus is shifted a distance $$\frac{t_p}{2}v$$

from the center of the magnetizer coil at the end of the current pulse (FIG. 4a). For a pulse of duration $t_p$ beginning at $t=0$, for magnetizer and detector coils of length $d_1$ and $d_2$ respectively, and for a distance $l$ between the coil centers, the center of a tagged bolus will reach the center of the detector coil in time $(l/v) + (t_p/2)$ after the trigger pulse is applied to the magnetizer solenoid power supply. The fluid which reaches maximum magnetization was a distance $(t_p v)/2$ to the left of the magnetizing coil when the magnetize pulse was triggered. A delay time $t_D$ (FIG. 4b) exists between the time the magnetization peak passes the center of the detector coil and the time an output pulse 3 is generated in the center of symmetry detector. This time delay is approximately equal to the reciprocal of the bandwidth of the detecting apparatus. Thus, the time between successive trigger pulses is $(l/v) + (t_p/2) + t_D$. Each pulse then corresponds to the passage of a volume $V_{cal}$ of fluid equal to $$V_{cal} = \left[\frac{l}{v} + \frac{t_p}{2} + t_D\right]Av$$

where A is the pipe cross section area.

If both $t_p/2$ and $t_D$ are very short with respect to $l/v$, then $V_{cal} = lA$. However, $t_p$ must be relatively large if sufficient fluid magnetization in practical fluids is to be obtained. Therefore, the pulses are triggered in such a manner as to compensate for the effects of the finite pulse duration $t_p$ and the detection delay $t_D$. Here $V_{cal\ true} = lA$.

The compensating scheme can best be understood by reference to FIG. 4c. A trigger pulse 1 to the magnetizer coil power supply occurs at $t=0$, and a current pulse 2 of duration $t_p$ is sent through the magnetizer coil, as shown in FIG. 4a. At the end of the magnetizer pulse, and after a manually set delay of $2t_D$ (illustrated diagrammatically as 4 in FIG. 4c), a triggering counter is started and continues to count until a pulse from the center of symmetry detector indicates that the magnetization peak has reached the center of the detector coil, a time $(l/v + f_p/2 + t_D)$ from time zero. At this time the counter is complemented so that it counts back toward zero as shown, the count being diagrammatically illustrated as 5 in FIG. 4c. Total counter actuation time is $$(2l/v) - t_p - 2t_D$$

When a zero count is reached, another trigger pulse is sent to the magnetizer coil power supply. The time between adjacent trigger pulses 1 is exactly $2l/v$, so that regardless of the length of $t_p$ or variations thereof, and for a fixed receiver bandwidth, the trigger pulse rate is a linear function of fluid velocity and the meter calibration factor is a constant for all fluids. For best readout resolution the output (FIG. 4d) contains a pulse 6 which is generated at the end of each pulse 1 and another pulse 7 which occurs each time the counter is complemented. Accordingly, output pulses occur at $t=t_p$, $(l/v) + t_p + t_D$, $2l/v + t_p$, etc. as illustrated in FIG. 4d.

The embodiment ilustrated in the accompanying drawings will now be specifically describedo. Referring now to FIG. 1, there is illustrated an arrangement embodying an illustrative embodiment of the present invention including a conduit 10 having a tagging coil 12 and a detecting coil 14. Suitable apparatus for tagging and detecting are more fully described in copending application Ser. No. 570,066 filed by Genthe et al. on Aug. 3, 1966, now Pat. No. 3,419,795.

The detecting coil is connected through an RF amplifier 16 and a detector 18 to a threshold detector 20. The detector 18 includes a low pass filter, so that the signal fed to the threshold detector 20 is a pulse having a gentle slope at its leading and trailing edges. The threshold detector generates a rectangular pulse having a leading edge at the point where the output of the detector 18 passes a predetermined amplitude, and a trailing edge when the output of the detector 18 decays through a similar amplitude. This pulse will be hereinafter referred to as a bolus pulse. The detector 18 may conveniently b a Schmitt trigger, or a similar wave shaping circuit. Accordingly, the output of the threshold detector 20 is a rectangular bolus pulse having a duration exactly equal to the duration of the bolus-generated pulse produced by the coil 14, the leading and trailing edges both marked by the same threshold amplitude of the pulse. Due to the restricted bandwidth within the detector 18, however, the bolus pulse is delayed in time relative to the pulse produced by the coil 14 by an amount $t_d$. This delay is compensated for elsewhere within the system.

The output of the threshold detector 20 is connected to a trailing edge detectoir 22 which produces a sharp, spike-like pulse at its output when the trailing edge of the bolus pulse occurs. Such a trailing edge detector may be an R-C differentiating circuit with an appropriately poled diode, or any other known type.

The output of the threshold detector 20 is also connected to one input of each pair of AND gates 24 and 26. A second input of each of the AND gates 24 and 26 is connected from the output of an oscillator 28, and third inputs to the AND gates 24 and 26 are connected to separate outputs of a flip-flop 30. The complementing input of the flip-flop 30 is connected to the output of the trailing edge detector 22, whereby the flip-flop 30 is caused to change its state each time a pulse is produced by the trailing edge detector 22. Accordingly, the flip-flop 30 is in one state for one bolus pulse, derived from the coil 14, and in its opposite state for the succeeding pulse, etc.

One of the outputs of the flip-flop 30 enables one of the AND gates 24 and 26 during the time of the bolus pulse.

During this period the oscillator 28 is connected through one of the AND gates 24 and 26 to separate inputs of a pair of counters 32 and 34. Both of the counters 32 and 34 are formed of a number of stages of flip-flops, each like that illustrated in FIG. 3. The output of the AND gate 24 is connected to an input 36, which is connected to the complementing input of the first flip-flop of the counter 32, hereinafter referred to as the counting input 36, and to a second input 38 connected to the complementing input of the second flip-flop of the counter 34, which will be hereinafter referred to as the double-rate input 38 of the counter 34. Similarly, the output of the AND gate 26 is connected to the counting input 40 of the counter 34 and to the double-rate input 42 of the counter 32. Assuming that the flip-flop 30 is in a state such that its right-hand output as viewed in FIG. 1 is high, the AND gate 24 is enabled so that the oscillator 28 is connected to the counting input 36 of the counter 32 and to the double-rate input 38 of the counter 34. As the three inputs to one of the AND gates 24 and 26 last for the duration of the bolus pulse, the counter 32 counts a total of pulses produced by the oscillator 28 proportional to the duration of the bolus pulse.

At the conclusion of the bolus pulse, the trailing edge detector 22 produces a pulse. This pulse is connected to a pair of AND gates 44 and 46. The AND gates 44 and 46 have separate inputs from the two outputs of the flip-flop 30, respectively. The output of the trailing edge detector 22 is also connected to the complementing input of the flip-flop 30, so that the state of the flip-flop 30 is changed at the time of the trailing edge of the bolus pulse. The AND gates 44 and 46 are relatively slow acting ones so that an output pulse is generated by one of them only after the flip-flop 30 has had time to change its state.

Accordingly, if the right-hand output of the flip-flop 30 were initially high during the duration of a bolus pulse, the trailing edge of this bolus pulse changes the state of the flip-flop 30 to render the left-hand input high and activate the AND gate 46 to pass the trailing edge pulse.

The output of the AND gate 46 is connected to a complementing input of the counter 32 and to a reset input of the counter 34. The complementing input of the counter 32 is effective to change the state of each flip-flop in the counter, and the reset input of the counter 34 is effective to reset every flip-flop in the counter 34 to one of its two stable states.

When the next bolus pulse is generated by the threshold detector 20, the condition of the flip-flop 30 is such that the left-hand output is high and the AND gate 26 is enabled to pass pulses from the oscillator 28 into the counting input 40 of the counter 34 and into the double-rate input 42 of the counter 32. As the counter 32 contains a count proportional to the length of the preceding bolus pulse, which has been complemented, the double-rate counting of the counter 32 will cause the count within the counter to arrive at zero after counting only one-half the number of pulses that were originally required to count the counter 32 to the value proportional to the length of the preceding bolus pulse. Thus the counter 32 reaches zero at a time after the beginning of the bolus pulse just equal to one-half the duration of the preceding bolus pulse. Assuming that the frequency of the oscillator 28 is about the same before and after complementing the counter 32, and that the two succeeding bolus pulses are about the same length, the zero condition of the counter 32 is reached at the instant that the center of symmetry of the bolus pulse is realized. At this instant, the last flip-flop of the counter 32 produces an overflow pulse from one of its outputs, and this pulse is conducted to the output line 48, which is connected to an OR gate 50.

The output of the OR gate 50 is connected to one input of an AND gate 52. The other input of the AND gate 52 is connected to the threshold detector 20, and, accordingly, receives the bolus pulses. There is therefore produced, at the output of the AND gate 52, a pulse whenever, during the interval of a bolus pulse, there is an overflow pulse from the output 48 of the counter 32.

At the conclusion of this bolus pulse, the trailing edge detector 22 again detects its trailing edge, resets the flip-flop 30, and passes the trailing edge pulse through AND gate 44 to reset the counter 32 and to complement the counter 34. In this condition the counter 34 is prepared for double-rate counting to identify the center of the next succeeding bolus. This output pulse, which is produced at an output 54, is connected to a second input of the OR gate 50. Thus the AND gate 52 produces an output pulse representing the overflow of either of the counters 32 or 34 during the interval of a pulse generated by the threshold detector 20.

The output of the AND gate 52 is connected to one input of an OR gate 56, the output of which is connected to an outpulse control 58. The function and operation of the outpulse control will be explained hereinafter. The output of the AND gate 52 is also connected to one input of a bolus compensator 60, the purpose of which is to compensate for effects due to the length of the bolus, and the delay introduced by the low pass filter within the detector 18.

The bolus compensator 6 energizes the pulse magnetizer 62. The pulse magnetizer thereupon produces a pulse of current which is applied by way of a line 64 to the magnetizing coil 12.

A threshold detector 66, similar to the detector 20 but also including a trailing edge detector such as the detector 22, is connected to the output of the pulse magnetizer 62 and is adapted to identify the end of the pulse supplied to the magnetizing coil 12. The output of the threshold detector 66 is connected to the bolus compensator 60 for a purpose which will be explained hereinafter. The output of the outpulse control is also connected to the bolus compensator, for a purpose which will be described hereinafter.

A second output from the outpulse control is connected to a counter 68. The counter 68 counts the number of pulses detected by the detecting coil 14. The count within the counter 68 is therefore proportional to the total quantity of fluid which has flowed through the conduit 10.

Figure 2:
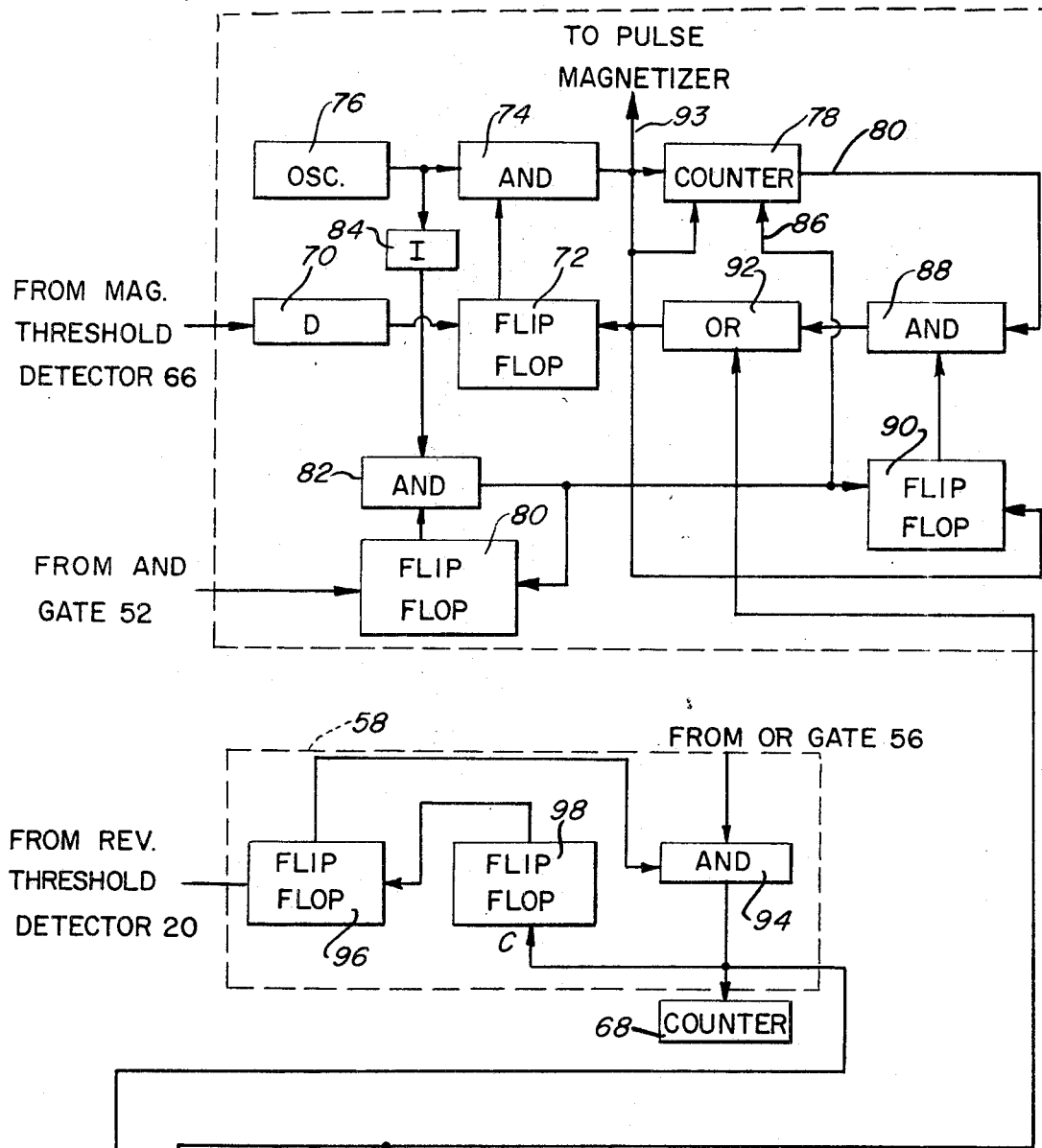
FIG. 2 is a more detailed functional block diagram of certain parts o fthe apparatus of FIG. 1.
Figure 2:
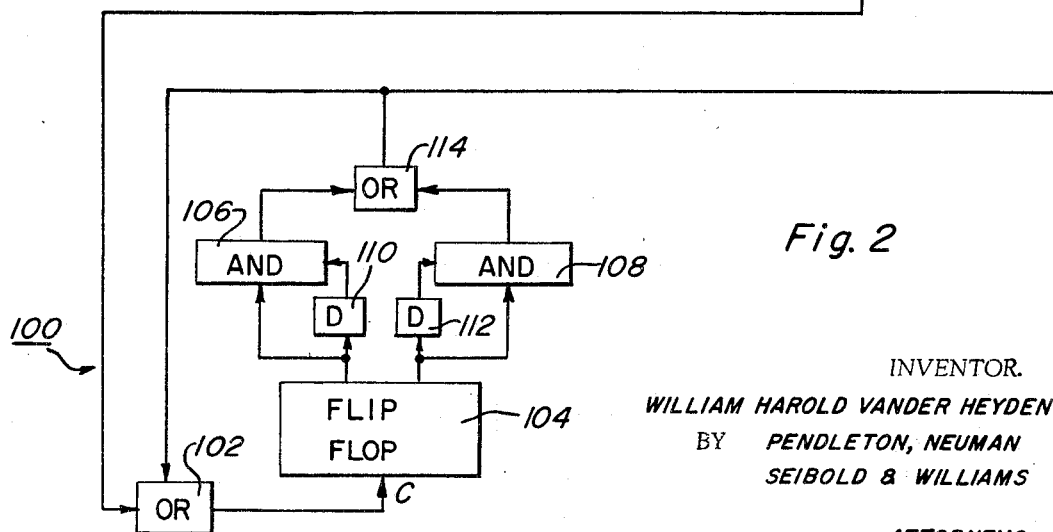

Referring now to FIG. 2, there is a more detailed functional block diagram of the bolus compensator 60 and the outpulse control 58.

The bolus compensator 60 includes an input from the threshold detector 66, which, as referred to above, identifies the end of the pulse produced by the pulse magnetizer 62. The threshold detector is connected to the input of a delay device 70 which delays the pulse for a short time to compensate for the delay introduced by the bandwidth of the detector 18. At the end of this delay, a pulse is produced which is connected to one input of a flip-flop 72, which serves to set the flip-flop 72 to the state in which its output lead is energized. The output of the flip-flop 72 is connected to one input of an AND gate 74. The other input of the AND gates 74 is connected to an oscillator 76 which is adapted to generate pulses at about 10 times the rate of the oscillator 28. The pulses from the oscillator 76 are passed through the AND gate 74 into a counter 78, where they are accumulated for the duration for which the flip-flop 72 is in its set state.

The output of the AND gate 52 constitutes a second input to the bolus compensator 60. This input is connected to one input of a flip-flop 80. The input from the AND gate 52 sets the flip-flop 80 such that its output is energized, and enables one input of an AND gate 82. A second input of the AND gate 82 is connected to an output of the oscillator 76 through an inverter 84. The function of the inverter 84 is to produce an output pulse between each successive pair of pulses produced by the oscillator 76. Therefore, the AND gate 82 can be energized only when the AND gate 74 is deenergized.

The setting of the flip-flop 80 by the pulse from the AND gate 52 permits the next pulse from the inverter 84 to pass through the AND gate 82 and reset the flip-flop 80 to the opposite state. The AND gate 82 can therefore pass only a single pulse for each pulse produced by the AND gate 52. The output of the AND gate 82 is also connected to the complementing input 86 of the counter 78, whereby all of the flip-flop stages of the counter 78 are at once complemented by reversing their state. The operation of the counter, however, in counting the pulses from the oscillator 76 is not disturbed so that after being complemented the counter 78 continues to count, but counts toward the zero condition of the counter 78. The zero condition is identified by an overflow pulse produced at the output 80 from the last flip-flop of the counter 78. The overflow pulse occurs at a time which is later than the arrival of the pulse from the AND gate 52 by exactly the same duration as exists between the pulse from the magnetizer threshold detector 66 (delayed by the delay unit 70) and the pulse arriving from the AND gate 52. In other words, it takes exactly as long to count the counter after complementing as before. The output 80 is connected to one input of the AND gate 88. The second input of the AND gate 88 is derived from the output of a flip-flop 90. The output of the AND gate 82 is connected to one input of the flip-flop 90, such that it is set in the state which energizes the input to the AND gate 88. Thus, after the arrival of the pulse indicating the center of symmetry (from the AND gate 52), the flip-flop 90 is set in a state to activate the AND gate 88. Thereafter, when the overflow pulse occurs at the output 80 of the counter 78, it is passed through the AND gate 88, and from there through an OR gate 92 to a lead 93 connected to the input of the pulse magnetizer 62. The pulse magnetizer is thus activated at a time following the receipt of a pulse from the AND gate 52, determined by the time required to count the counter 78 with pulses from the oscillator 76.

The output of the OR gate 92 is also connected to the opposite inputs of the flip-flops 72 and 90 to reset them to their opposite states, and to the reset input of the counter 78, whereby all of the flip-flops in the counter 78 are reset. The circuit is thus restored to a condition so that the next pulse from the threshold detector 66 can repeat the process, at the end of the magnetizing pulse generated in response to the signal from the OR gate 92.

The outpulse control 58 is provided to accomplish two purposes. One is to increase the resolution of the total fluid quantity manifested by the counter 68 by providing two pulses to the counter 68 for each tagging pulse. To accomplish this the two inputs of the OR gate 56 are connected to receive an output from the AND gate 52 (which identifies the center of symmetry of a bolus pulse) and also to receive an output of the threshold detector 66 (which identifies the end of a magnetizing pulse). Thus, for each cycle, two pulses are passed by the OR gate 56 and are accumulated in the counter 68. The two pulses identified during each cycle are approximately equally spaced in time and identify equal quantities of fluid flowing through the conduit 10. It will be appreciated from inspection of FIG. 4d, which illustrates the pulses passed by the OR gate 56, that the two pulses are equally spaced, providing that $t_D = t_p/2$. If there is no need for the pulses to be equally spaced, no such limitation is placed on the magnitude of the delay $t_D$. This condition can readily be brought about by maintaining the given relation between the delay introduced principally by the low pass filter within the detector 18, and the duration of the magnetizing pulse. The delay of the low pass filter is a function primarily of its bandwidth, which can be regulated by proper choice of the parameters of the filter as well known to those skilled in the art. The duration of the magnetizing pulse can also be controlled by proper design of the pulse magnetizer 62.

The second purpose to be accomplished by the output pulse controller 58 is to supply missing pulses which may be lost on account of a flow velocity through the conduit 10 being insufficient to activate the detection coil 14. Thus, if the flow is extremely slow, the tag will be completely dissipated by the time the fluid reaches the detecting station 14, and no bolus pulse will be produced by the detecting circuitry. As the magnetizing coil 12 must be pulled to produce a subsequent tag, and this pulse is derived from the bolus pulse, any tag which goes undetected by virtue of slow fluid flow or the like must be replaced by some other means or else on subsequent tagging can occur. Accordingly, the outpulse control 58 supplies such a pulse, and such a pulse will be referred to hereinafter as a searching pulse.

The output of the OR gate 56 is connected to one input of an AND gate 94 (FIG. 2) within the outpulse controller 58. A second input to the AND gate 94 is derived from a flip-flop 96 which is normally in the proper state so that its output enables the AND gate 94 to pass the pulses from the OR gate 56. The output of the AND gate 94 is connected to the complementing input of a flip-flop 98, one output of which is connected to one input of the flip-flop 96. Assuming that the flip-flop 96 is in the state in which its output is high, the first pulse arriving from the OR gate 56 passes through the AND gate 94 and resets the state of the flip-flop 98 so that its output becomes low. The second pulse arriving from the OR gate 56 passes through the AND gate 94 and sets flip-flop 98 so that its output again becomes high. The rising output of the flip-flop 98 sets the flip-flop 96, such that the AND gate 94 is disabled. No succeeding pulses can pass through the AND gate 94 until the flip-flop 96 is reset. The resetting input to the flip-flop 96 is derived from the output of the threshold detector 20 (FIG. 1). The threshold detector 20 produces a pulse whenever a pulse is detected at the receiving coil 14. Thus, if a bolus is detected by the receiving coil 14, once for each two pulses passed by the OR gate 56, the flip-flop 96 will be reset in time to energize the gate 94 for passage of the succeeding pulses from the OR gate 56. If, however, there is no pulse from the threshold detector 20, due to low flow rates, for example, the flip-flop 96 is not reset and no further pulses can pass through the AND gate 94. A pulse generator 100 is connected to the output of the AND gate 94 and it is conditioned so as to produce an output pulse whenever there has been no input pulse (from the AND gate 94) for a predetermined period of time. This predetermined period of time slightly exceeds the duration between two pulses normally passed by the AND gate 94 for any practical velocity of fluid flow. Thus, if no pulse is passed by the AND gate 94 within the predetermined time, a pulse is produced by the pulse generator 100. The output of the pulse generator 100 is connected to one input of the OR gate 92. As the output of the OR gate 92 energizes the pulse magnetizer 62 and also resets the counter 78 and the flip-flops 72 and 90 of the bolus compensator, a tagging pulse is produced by the pulse magnetizer 62 for each search pulse from the generator 100. Accordingly, the output of the pulse generator 100 is a switching pulse which energizes the pulse magnetizer and restarts the repetitive operation of the system, by pulsing the pulse magnetizer as many times as necessary until a bolus pulse is generated by the threshold detector 66.

The pulse generator 100 includes an OR gate 102, to which the output of the AND gate 94 is connected, and the output of the OR gate 102 is connected to the complementing input of a flip-flop 104. Each pulse passed by the OR gate 102 changes the state of the flip-flop 104, and causes one of its outputs to assume a high state.

The outputs of the flip-flop 104 are connected to one input of two AND gates 106 and 108, respectively, and also to delay units 110 and 112, respectively. The delay units 110 and 112 are energized when their respective outputs from the flip-flop 104 become high, and produce a pulse at their outputs after a predetermined time. If the state of the flip-flop 104 has not been changed again before the end of that time, one of the AND gates 106 and 108 produces a pulse. The outputs of the AND gates are connected to two inputs of an OR gate 114, the output of which is connected to the input of the OR gate 92, to fire the pulse magnetizer 62, and to an input of the OR gate 102 to change the state of the flip-flop 104 to begin another cycle. If the state of the flip-flop 104 is changed before the expiration of the predetermined time, by the application of normal pulses from the AND gate 94, neither of the AND gates 106 and 108 has two coincident inputs, and so no pulse is passed by the OR gate 114.

Figure 3:
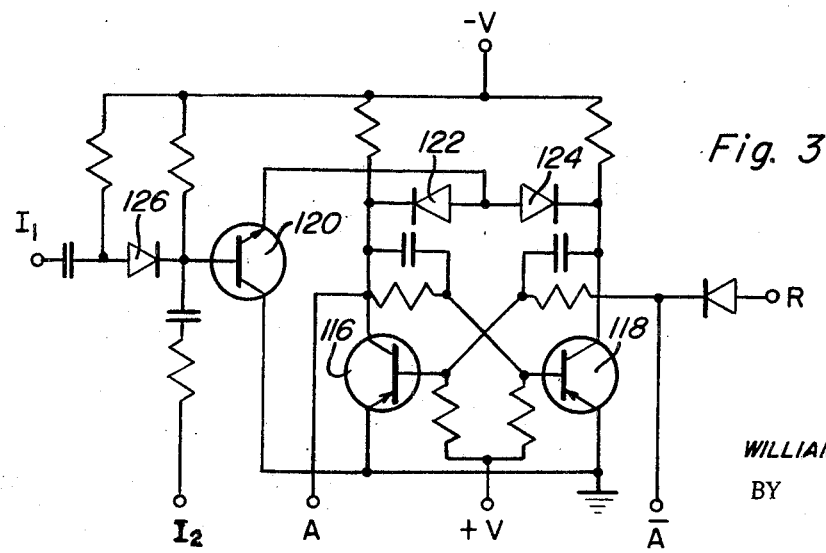
FIG. 3 is a schematic diagram of one of several flip-flops employed in the embodiment illustrated in FIGS. 1 and 2.

Referring now to FIG. 3, there is illustrated, in schematic form, a transistor flip-flop which may be utilized in the flip-flops and counters which have been referred to. The flip-flop includes a pair of transistors 116 and 118 having grounded emitters and with their collectors and bases cross-coupled to render them conducting mutually exclusively. Two outputs indicated at A and $\bar{A}$ are available at the collectors of the two transistors. A third transistor 120 has its collector grounded, and its emitter connected via diodes 122 and 124 to the collectors of the two transistors 116 and 118. The transistor 120 is normally nonconductive, but when rendered conductive by a positive pulse on either of the inputs $I_1$ or $I_2$, is effective to change the states of conduction of the transistors 116 and 118, and thus complement the condition of the flip-flop. The input $I_1$ is provided with a diode 126 for purposes of isolation. A positive pulse applied to the reset input R, resets the flip-flop to the state in which the transistor 118 is conducting and the transistor 116 is not.

In a practical embodiment of the present invention, the frequency of the oscillator 28 is about 10 kc., and the frequency of the oscillator 76 is about 100 kc. The frequency stability of neither is critical, as long as the time rate of change of drift is small.

It will be appreciated that means are provided to accomplish resetting the flip-flops of the system in order to initiate the operation of the system. These means have not been specifically described, for such means are well known to those skilled in the art.

What is claimed is:

1. A triggering circuit for identifying the midpoint of the duration of the second of two successive input pulses, comprising:
  a constant frequency source of pulses having a period short in relation to the period of said input pulses,
  counting means,
  first control means connected with said source and with said counting means and responsive to the first of said input pulses for causing said counting means to count the number of pulses issuing from said source during the period of said first input pulse,
  second control means connected with said source and with said counting means and responsive to said second input pulse for causing said counting means to count pulses issuing from said source during the first part of said second pulse, and
  means connected to said counting means for manifesting a trigger signal when the number of pulses counted by said counting means under control of said second control means is equal to half the number of pulses counted by said counting means under control of said first control means.

2. Apparatus according to claim 1, including a bistable device for assuming a first stable state during said first input pulse and a second stable state during said second input pulse,
  said first control means including a first gate connected to said bistable device, said first gate being enabled when said bistable device is in its first state,
  said second control means including a second gate connected to said bistable device, said second gate being enabled when said bistable device is in its second state, and
  said counting means comprising a plurality of bistable devices connected for binary counting, said first gate interconnecting said source with the lowest order bistable device of said counting means, and said second gate interconnecting said source with the second lowest order bistable device of said counting means.

3. Apparatus according to claim 2, including means for complementing the states of all of the bistable devices in said counting means after said first input pulse and before said second input pulse.

4. Apparatus according to claim 2, including a second counting means,
  said second counting means comprising a plurality of bistable devices connected for binary counting, said first gate interconnecting said source with the second lowest order bistable device of said second counting means, and said second gate interconnecting said source with the lowest order bistable device of said second counting means,
  means for resetting said second counting means and complementing said first counting means after every two input pulses in a succession of input pulses, and
  means for complementing said second counting means and resetting said first counting means after every input pulse immediately following the resetting of said second counting means.

5. A triggering circuit for triggering tagging pulses in a fluid flowmeter having a fluid conduit means, comprising:
  means for applying a tag of finite duration to a bolus of fluid flowing through said conduit,
  threshold means connected to said tagging means for generating a first signal at the end of said finite duration,
  detecting means disposed downstream of said tagging means for generating a second signal responsive to the passage of the midpoint of said tagged bolus,
  a constant frequency source of pulses having a period short in relation to the time required for said fluid to flow from said tagging means to said detecting means,
  counting means,
  first control means connected with said source, with said threshold means, and with said counting means for causing said counting means to count the number of pulses issuing from said source after said first signal until the occurrence of said second signal,
  second control means connected with said source and with said counting means for causing said counting means to count pulses issuing from said source following said second signal,
  means connected to said counting means for manifesting a triggering signal when the number of pulses counted by said counting means under control of said second control means is equal to the number of pulses counted by said counting means under control of said first control means, and
  means connecting said triggering signal to said tagging means.

6. Apparatus according to claim 5, including first delay means having an input connected in circuit with said detecting means and an output, said first delay means delaying the appearance of said second signal at its output for a predetermined duration after it is generated by said detecting means, and
  second delay means having an input in circuit with said threshold means and an output, said second delay means delaying the appearance of said first signal at its output for a duration equal to twice said predetermined duration.

7. Apparatus according to claim 6, wherein said predetermined duration is equal to twice said finite duration.

8. Apparatus according to claim 5, wherein said first and second control means comprise a gate interconnecting said sourec and said counter,
means responsive to said first signal for enabling said gate, said counting means comprising a plurality of bistable devices connected for binary counting, and
means responsive to said second signal for complementing the states of all of said bistable devices.

9. Apparatus according to claim 5, including second counting means, said second counting means being connected to said detecting means for counting the number of said second signals.

10. Apparatus according to claim 5, wherein said detecting means comprises means for generating a bolus pulse responsive to the passage of each said bolus, each said bolus pulse having a duration equal to the passage of said bolus past said detecting means,
a second constant frequency source of pulses having a period short in relation to the period of said bolus pulses,
a second counting means,
third control means connected to said second source and to said second counting means and responsive to one of said bolus pulses for causing said second counting means to count the number of pulses issuing from said second source during the period of said first input pulse,
fourth control means connected with said second source and with said second counting means and responsive to a subsequent bolus pulse for causing said second counting means to count pulses issuing from said source during the first part of said second pulse,
and means connected to said second counting means for manifesting a said second signal when the number of pulses counted by said counting means under control of said fourth control means is equal to half the number of pulses counted by said counting means under control of said third control means.

References Cited

UNITED STATES PATENTS

| 3,302,446 | 2/1967 | Schmitt et al. | 73—194 XR |
| 3,327,806 | 6/1967 | Anderson. | |
| 3,345,863 | 10/1967 | Henry et al. | 73—67.5 |

OTHER REFERENCES

Watkin: "Flow Measurement by Infrared Tracer," Instruments & Control Systems, vol. 39, June 1966, pp. 161–163, copy in 73–194.

CHARLES A. RUEHL, Primary Examiner

UNITED STATES PATENT OFFICE
CERTIFICATE OF CORRECTION

Patent No. 3,512,410                Dated May 19, 1970

Inventor(s) William H. Vander Heyden

It is certified that error appears in the above-identified patent and that said Letters Patent are hereby corrected as shown below:

Column 2, line 35 — "spectifically" should be --specifically--

Column 3, line 32 — "$t_p \leq d_1/v_{mnx}$" should be --$t_p \leq d_1/v_{max}$--

Column 4, line 7 — "$(1/v + f_p/2 + t_D)$" should be
-- $(1/v + t_p/2 + t_D)$ --

Column 4, line 26 — "describedo" should be -- described --

Column 4, line 45 — "b" should be -- be --

Column 4, line 56 — "detectoir" should be -- detector --

Column 5, line 22 — after "total" insert -- number --

Column 6, line 27 — "6" should be -- 60 --

Column 8, line 11 — "pulled" should be -- pulsed --

Column 8, line 15 — "on" should be -- no --

Column 9, line 26 — "at" should be -- as --

Column 11, line 7 — "sourec" should be -- source --

SIGNED AND
SEALED
SEP 22 1970

(SEAL)
Attest:

Edward M. Fletcher, Jr.
Attesting Officer

WILLIAM E. SCHUYLER, JR.
Commissioner of Patents